(12) United States Patent
Paternoster et al.

(10) Patent No.: US 10,780,636 B2
(45) Date of Patent: Sep. 22, 2020

(54) RECOATING UNIT, RECOATING METHOD, DEVICE AND METHOD FOR ADDITIVE MANUFACTURING OF A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, München (DE)

(73) Assignee: EOS GmbH Electro Optical Systems, Krailling (DE)

( * ) Notice: Subject to any disclaimer, the term of this patent is extended or adjusted under 35 U.S.C. 154(b) by 598 days.

(21) Appl. No.: 15/630,054

(22) Filed: Jun. 22, 2017

(65) Prior Publication Data
US 2018/0001559 A1    Jan. 4, 2018

(30) Foreign Application Priority Data
Jun. 30, 2016   (DE) .................... 10 2016 211 952

(51) Int. Cl.
*B29C 64/00* (2017.01)
*B22F 3/00* (2006.01)
(Continued)

(52) U.S. Cl.
CPC ............ *B29C 64/218* (2017.08); *B22F 3/008* (2013.01); *B28B 1/001* (2013.01); *B29C 64/153* (2017.08);
(Continued)

(58) Field of Classification Search
CPC ......... B29C 64/00; B29C 64/10; B29C 64/15; B29C 64/153; B29C 64/20; B29C 64/21;
(Continued)

(56) References Cited

U.S. PATENT DOCUMENTS

| 5,786,562 A | 7/1998 | Larson |
| 2002/0195747 A1 | 12/2002 | Hull et al. |

(Continued)

FOREIGN PATENT DOCUMENTS

| WO | 2013/092757 A1 | 6/2013 |
| WO | 2015/082677 A1 | 6/2015 |

*Primary Examiner* — Jacob T Minskey
*Assistant Examiner* — Matthew Hoover
(74) *Attorney, Agent, or Firm* — Seyfarth Shaw LLP (57) ABSTRACT

A recoating unit (40) serves for equipping or retrofitting a device (1) for additive manufacturing of a three-dimensional object (2) by selectively solidifying a building material (15), preferably a powder, layer by layer. The device (1) comprises a recoater (16) movable across a build area (8) for applying a layer (31*b*, 32*b*) of the building material (15) within the build area (8) and a solidification device (20) for selectively solidifying the applied layer (31*b*, 32*b*) at positions corresponding to a cross-section of the object (2) to be manufactured. The device (1) is formed and/or controlled to repeat the steps of applying and selectively solidifying until the object (2) is completed. The recoating unit (40) comprises at least two recoating rollers (41, 42) spaced apart from each other in a first direction (B1) and extending into a second direction transversely, preferably perpendicularly, to the first direction, and a compacting and/or smoothing element (45) arranged between the two recoating rollers (41, 42) in the first direction (B1) and extending into the second direction. The recoating unit (40) is adapted to draw-out building material to a regular layer (31*a*, 32*a*), depending on the movement of the recoating unit into the first direction (B1) or into its reverse direction (B2), using the recoating roller (41, 42) arranged ahead in the respective moving direction (B1, B2), and to compact or smoothen the layer (31*a*, 32*a*) drawn-out by the recoating roller (41, 42) arranged ahead using the compacting and/or smoothing element (45).

12 Claims, 3 Drawing Sheets

(51) Int. Cl.
*B28B 1/00* (2006.01)
*B29C 64/218* (2017.01)
*B29C 64/214* (2017.01)
*B29C 64/153* (2017.01)
*B29C 64/241* (2017.01)
*B33Y 10/00* (2015.01)
*B33Y 30/00* (2015.01)
*B22F 3/105* (2006.01)

(52) U.S. Cl.
CPC .......... *B29C 64/214* (2017.08); *B29C 64/241* (2017.08); *B33Y 10/00* (2014.12); *B33Y 30/00* (2014.12); *B22F 3/1055* (2013.01); *B22F 2003/1056* (2013.01); *B22F 2999/00* (2013.01); *Y02P 10/295* (2015.11)

(58) Field of Classification Search
CPC ..... B29C 64/214; B29C 64/218; B29C 64/24; B29C 64/241; B22F 3/00; B22F 3/008; B28B 1/00; B28B 1/001
See application file for complete search history.

(56) References Cited

U.S. PATENT DOCUMENTS

| | | |
|---|---|---|
| 2008/0156263 A1 | 7/2008 | Montero-Escuder et al. |
| 2012/0164322 A1* | 6/2012 | Teulet .................... B22F 5/006 427/180 |
| 2014/0363585 A1 | 12/2014 | Pialot et al. |
| 2015/0139849 A1* | 5/2015 | Pialot, Jr. ............. B23K 26/342 419/55 |
| 2015/0202826 A1* | 7/2015 | Paternoster ........... B29C 64/386 428/474.7 |
| 2017/0341365 A1 | 11/2017 | DeLajudie et al. |

\* cited by examiner

RECOATING UNIT, RECOATING METHOD, DEVICE AND METHOD FOR ADDITIVE MANUFACTURING OF A THREE-DIMENSIONAL OBJECT

TECHNICAL FIELD OF THE INVENTION

The present invention relates to a method and a device for additive manufacturing of a three-dimensional object by applying a building material, preferably a powder, layer by layer and selectively solidifying it, especially to a recoating unit contained in the device and used for the method as well as to a corresponding recoating method.

BACKGROUND OF THE INVENTION

Devices and methods of this kind are used for example for Rapid Prototyping, Rapid Tooling or Additive Manufacturing. An example of such a method is known by the name "selective laser sintering or laser melting". Therein, repeatedly a thin layer of pulverulent building material is applied, and the building material in each layer is selectively solidified by selectively irradiating positions corresponding to a cross-section of the object to be manufactured with a laser beam.

WO 2013/092757 A1 describes a device and a method for additive manufacturing of a three-dimensional object from powder. In one embodiment, the powder is applied to the build area by a powder supply that includes a dosing roller and moves across the build area. The applied powder is drawn-out to a regular layer by a height-adjustable distributing roller moving behind the powder supply and compacted by a compacting roller following behind which is arranged closer to the build area than the distributing roller, whereby the layer thickness is reduced. The recoating direction is predetermined by the succession of the rollers.

SUMMARY OF THE INVENTION

The object of the present invention is to provide an alternative or improved recoating unit or manufacturing device or an alternative or improved recoating or manufacturing method for a three-dimensional object by application and selective solidification of the building material layer by layer, wherein especially the recoating direction may easily be changed.

The object is obtained by a recoating unit, a recoater, a manufacturing device, a recoating method, and a manufacturing method.

The recoating unit according to the invention serves for equipping or retrofitting a device for additive manufacturing of a three-dimensional object by selectively solidifying a building material, preferably a powder, layer by layer, wherein the device comprises a recoater movable across a build area for applying a layer of the building material within the build area and a solidification device for selectively solidifying the applied layer at positions corresponding to a cross-section of the object to be manufactured, and is formed and/or controlled to repeat the steps of applying and selectively solidifying until the object is completed. The recoating unit comprises at least two recoating rollers spaced apart from each other in a first direction and extending into a second direction transversely, preferably perpendicularly, to the first direction, and a compacting and/or smoothing element arranged between the two recoating rollers in the first direction and extending into the second direction. The recoating unit is adapted to draw-out building material to a uniform layer, depending on the movement of the recoating unit into the first direction or into its reverse direction, using the recoating roller arranged ahead in the respective moving direction, and to compact or smoothen the layer drawn-out by the recoating roller arranged ahead using the compacting and/or smoothing element. Such a recoating unit makes it possible, for example, to effect applying and compacting and/or smoothing a material layer serving for building the object separately from each other by an individual element, respectively, wherein the recoating unit nevertheless may be used in recoating directions opposite to each other.

Preferably, the compacting and/or smoothing element is arranged essentially centered in the first direction between the two recoating rollers and/or is formed essentially in an unsymmetrical way or in a mirror-symmetrical way in the first direction. This makes it possible, for example, to adapt the compacting and/or smoothing effect well to the respective requirements.

Preferably, the compacting and/or smoothing element is a blade (or alternatively a roller which preferably is supported in a rotatable way, for example by means of an actuator and/or indirectly effected and driven by the movement of the recoating unit) extending into the second direction and into a third direction perpendicular to the first and second directions which has, at its lower side positioned in the third direction and facing into the direction of the build area, at least one sloped compacting and/or smoothing plane and/or a rounding, preferably in form of a cylindrical segment and/or a roof-shaped element, for compacting and/or smoothing the layer. Such a blade, for example, is a compacting and/or smoothing element which can easily be realized, and the corresponding geometry of the blade makes it possible, for example, to adapt the compacting and/or smoothing effect where it to the respective requirements.

Preferably, the compacting and/or smoothing element is arranged in an exchangeable way in the recoating unit. This makes it possible, for example, to easily remove the compacting and/or smoothing element from the recoating unit, for example for cleaning and/or maintenance purposes, and to easily replace it in the case of a damage, and for each build job, a compacting and/or smoothing element adapted to the requirements of the respective build job can be used.

Preferably, the compacting and/or smoothing element is arranged in the third direction in a manually or automatically adjustable way in the recoating unit. This makes it possible, for example, to adapt a height of the compacting and/or smoothing element over the build area easily to the requirements of the respective build job.

Preferably, the two recoating rollers have the same diameter and/or the two recoating rollers are arranged drivable in rotational directions opposite to each other in the recoating unit. This makes it possible, for example, to achieve a symmetrical behavior in recoating directions opposite to each other.

The recoater according to the invention serves for equipping or retrofitting a device for additive manufacturing of a three-dimensional object by selectively solidifying a building material, preferably a powder, layer by layer, wherein the device is adapted to receive the recoater in a way so that it is movable across a build area for applying a layer of the building material within the build area, comprises a solidification device for selectively solidifying the applied layer at positions corresponding to a cross-section of the object to be manufactured, and is formed and/or controlled to repeat the steps of applying and selectively solidifying until the object is completed. The recoater comprises a recoating unit according to the invention. Such a recoater makes it possible, for example, to effect applying and compacting and/or smoothing a material layer serving for building the object separately from each other by an individual element, respectively, wherein the recoater nevertheless may be used in recoating directions opposite to each other.

Preferably, the recoating unit comprised in the recoater is an exchangeable recoating module. This makes it possible, for example, to easily adapt the recoater to different recoating requirements depending on the type of the material used and/or the desired layer thickness.

The manufacturing device according to the invention serves for additive manufacturing of a three-dimensional object by selectively solidifying a building material, preferably a powder, layer by layer. The device comprises a recoater movable across a build area for applying a layer of the building material within the build area and a solidification device for selectively solidifying the applied layer at positions corresponding to a cross-section of the object to be manufactured. The device is formed and/or controlled to repeat the steps of applying and selectively solidifying until the object is completed. The recoater is formed as a recoater according to the invention. Such a manufacturing device makes it possible, for example, to effect applying and compacting and/or smoothing a material layer serving for building the object separately from each other by an individual element, respectively, wherein the recoater nevertheless may be used in recoating directions opposite to each other.

Preferably, the device further comprises a device for supplying building material in front of the roller arranged ahead in the respective movement direction. This makes it possible, for example, to supply the building material serving for building the object onto the build area independently from the recoating unit.

Preferably, the recoating unit is arranged within the device in a way that the first direction is the movement direction of the recoater across the build area and the third direction is the vertical direction perpendicular to the build area. This makes it possible, for example, to draw-out the building material serving for building the object in a direction traverse to the recoating unit and to change the vertical height adjustment of the recoating rollers and/or the compacting and/or smoothing element.

The recoating method according to the invention is carried out in a device for additive manufacturing of a three-dimensional object by selectively solidifying a building material, preferably a powder, layer by layer, wherein the device comprises a recoater movable across a build area for applying a layer of the building material within the build area and a solidification device for selectively solidifying the applied layer at positions corresponding to a cross-section of the object to be manufactured and is formed and/or controlled to repeat the steps of applying and selectively solidifying until the object is completed. The recoating method is carried out using a recoating unit which comprises at least two recoating rollers spaced apart from each other in a first direction and extending into a second direction transversely, preferably perpendicularly, to the first direction, and a compacting and/or smoothing element arranged between the two recoating rollers in the first direction and extending into the second direction. The recoating unit draws-out building material to a uniform layer, depending on the movement of the recoating unit into the first direction or into its reverse direction, using the recoating roller arranged ahead in the respective moving direction, and the layer drawn-out by the recoating roller arranged ahead is compacted or smoothened using the compacting and/or smoothing element. Such a recoating method makes it possible, for example, to effect applying and compacting and/or smoothing a material layer serving for building the object separately from each other by an individual element, respectively, wherein the recoater nevertheless may be used in recoating directions opposite to each other.

Preferably, a lower side of the compacting and/or smoothing element facing the build area is arranged closer to the build area than the lower sides of the two recoating rollers facing the build area and/or the lower sides of the two recoating rollers facing the build area essentially have the same distance from the build area. This makes it possible, for example, that the recoating roller respectively arranged ahead draws out the building material to a regular layer, while the compacting and/or smoothing element reduces the layer thickness of the drawn-out layer and/or further smoothens and/or compacts the building material, and the same characteristics may be achieved in recoating directions opposite to each other.

Preferably, the rotational direction of each of the recoating rollers is selected in a way that each recoating roller, when it is the recoating roller arranged ahead in the respective movement direction, rotates in a contra-rotating way with regard to the respective movement direction. This makes it possible, for example, to draw-out the building material to a layer with as low shear as possible.

The manufacturing method according to the invention serves for additive manufacturing of a three-dimensional object by selectively solidifying a building material, preferably a powder, layer by layer. The method comprises the steps of applying a layer of the building material within a build area by means of a recoater moving in a first direction and in its reverse direction across the build area, selectively solidifying the applied layer at positions corresponding to a cross-section of the object to be manufactured, by means of a solidification device and repeating the steps of applying and selectively solidifying until the object is completed. For applying the layer, a recoating method according to the invention is carried out. This makes it possible, for example, to take benefit of the advantages of the recoating method according to the invention for producing a three-dimensional object.

Further features and advantages of the invention will arise from the description of embodiments by reference to the appended drawings which not necessarily have to be regarded as being true to scale.

DETAILED DESCRIPTION OF THE EMBODIMENTS

Figure 1:
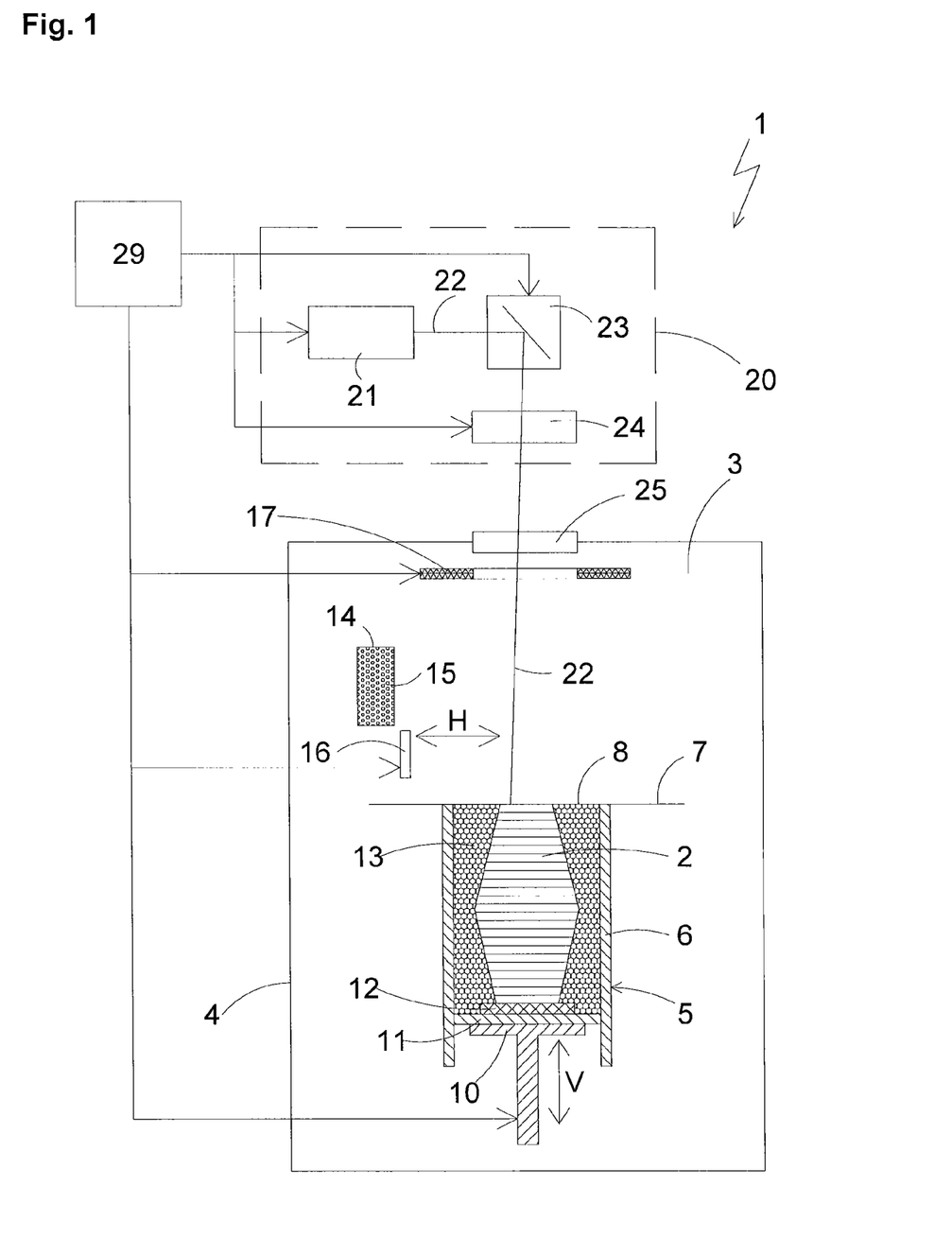
FIG. 1 is a schematic view partially illustrated in cross-section of a device for additive manufacturing of a three-dimensional object layer by layer according to an embodiment of the present invention.

In the following, an embodiment of the present invention is described with reference to FIG. 1. The device illustrated in FIG. 1 is a laser sintering or laser melting device 1. In order to produce an object 2, it includes a process chamber 3 having a chamber wall 4.

In the process chamber 3, a container 5 is arranged which is open at the top and has a container wall 6. By the opening at the top of the container 5, a working plane 7 is defined wherein the area of the working plane 7 which is positioned within the opening and can be used for building the object is designated as a build area 8.

In the container 5, a carrier 10 is arranged which is movable in a vertical direction V and at which a base plate 11 is mounted, closing the container 5 at the bottom and thereby forming its ground. The base plate 11 may be a plate which is formed separately from the carrier 10 and which is mounted at the carrier 7, or it may be formed integrally with the carrier 10. Depending on the powder used and the process performed, a building platform 12 on which the object 2 is built may be mounted as a building base to the base plate 11. The object 2 may, however, also be built on the base plate 11 itself, which then serves as a building base. In FIG. 1 the object 2 to be built in the container 5 on the building platform 12 is illustrated below the working plane 7 in an intermediate state including multiple solidified layers, surrounded by building material 13 that has remained unsolidified.

The laser sintering device 1 further contains a storage container 14 for a pulverulent building material 15 which is solidifyable by means of electromagnetic radiation, and a recoater 16 movable in a horizontal direction H for applying the building material 15 within the building area 8. Optionally, a radiation heater 17 that serves for heating the applied building material 15 is arranged within the process chamber 3. An infra-red radiating device, for example, may be used as the radiation heater 17.

The laser sintering device 1 further contains an irradiation device 20 comprising a laser 21 which generates a laser beam 22 which is deflected by a deflecting device 23 and focused onto the working plane 7 by means of a focusing device 24 through a coupling window 25 arranged at the topside of the process chamber 3 in the chamber wall 4.

Further, the laser sintering device 1 includes a control unit 29, by means of which the individual constituent parts of the device 1 are controlled in a coordinated manner in order to perform the building process. As an alternative, the control unit may also partially or entirely be arranged outside the device. The control unit may include a CPU, the operation of which is controlled by a computer program (software). The computer program may be stored separately from the device on a storage medium, from which it may be loaded into the device, particularly into the control unit.

In operation, in order to apply a powder layer, the carrier 10 is first lowered by a height, which corresponds to the desired layer thickness. The recoater 16 first moves to the storage container 14 and gathers from it an amount of the building material 15 which is sufficient for applying a layer. It then moves across the build area 8 and applies a thin layer of the pulverulent building material 15 onto the building base or a present powder layer. The application is carried out at least across the whole cross-section of the object 2 to be produced, preferably across the complete build area 8, i.e. the area delimited by the container wall 6. Optionally, the pulverulent building material 15 is heated by the radiation heater to a working temperature. Subsequently, the cross-section of the object 2 to be produced is scanned by the laser beam 22 so that the pulverulent building material 13 is solidified at positions which correspond to the cross-section of the object 2 to be produced. In that process, the powder particles at those positions are partially or entirely melted so that after cooling, they are connected to each other in form of a solid body. These steps are repeated until the object 2 is completed and can be removed from the process chamber 3.

Figure 2:
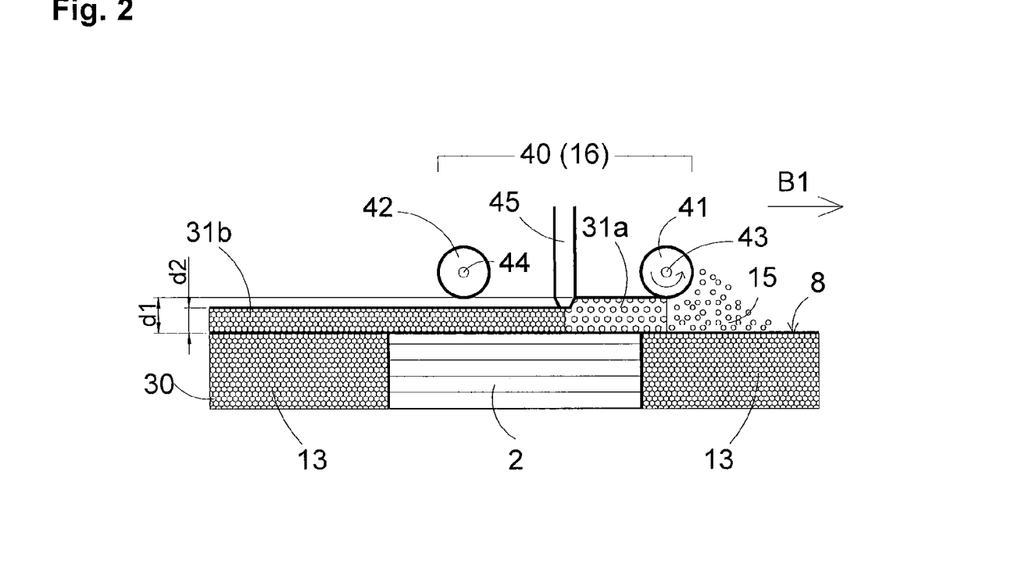
FIG. 2 is a schematic view of a portion of the device shown in FIG. 1 during an application of a powder layer in a first recoating direction.

The recoating process is shown in FIG. 2 more in detail. In a powder bed 30 built by the preceding process steps, the solidified portion of the object 2 to be produced is surrounded by powder 13 that has been left unsolidified. By means of a movement of the recoater in a first recoating direction B1, a further powder layer of the building material 15 is applied onto the powder bed 30.

As shown in FIG. 2, the recoater comprises a recoating unit 40 which is fixedly attached to the recoater or which may be formed as an exchangeable module. The recoating unit 40 comprises two recoating rollers 41, 42 which are spaced apart from each other in the first recoating direction B1, which extend transversely, preferably perpendicularly, to the first recoating direction B1 in parallel with the build area 8 (perpendicular to the drawing area in the figure), and which are supported in a manner to be rotatable around rotation axes 43, 44 extending along their longitudinal directions. The two recoating rollers 41, 42 may preferably be driven to rotate independently of each other. As will be apparent from the description of the recoating process, it is advantageous if the recoating rollers 41, 42 can be driven in rotational directions opposite to each other. In the present embodiment, the two recoating rollers 41, 42 have the same diameter. They may, however, also have different diameters. Preferably, the recoating rollers 41, 42 are arranged in the recoating unit 40 in a way that their lower sides facing the working area essentially have the same distance from the build area 8.

Between the recoating rollers 41, 42 a compacting blade 45 is arranged as a compacting and/or smoothing element. The compacting blade 45 also extends transversely, preferably perpendicularly, to the first recoating direction B1 (perpendicular to the drawing area in the figure) and perpendicularly to the build area 8. Preferably, the compacting blade 45 is arranged centered between the recoating rollers 41, 42. Further preferably, the compacting blade 45 is arranged in an exchangeable way in the recoating unit 40 so that it can easily be removed from the recoating unit 40 for cleaning or maintenance purposes and/or it can easily be replaced in the case of a damage. Moreover, the geometry of the compacting blade described below with reference to FIG. 4 can easily be adopted to the requirements of the respective build job.

The two recoating rollers 41, 42 and/or the compacting blade 45 are preferably arranged within the recoating unit 40 in a height-adjustable way (i.e. adjustable in a vertical direction perpendicular to the build area 8). The two recoating rollers 41, 42 may be height-adjustable independently of each other, but they may also be arranged within the recoating unit 40 in a way that their height adjustment is coupled. The height adjustment may be realized manually or automatically, for example in an electric or pneumatic way, preferably controlled by a computer.

When moving the recoating unit 40 in the first recoating direction B1, the recoating roller 41 arranged ahead is driven in a way that it rotates with reference to the first recoating direction B1 in a contra-rotating way (counterclockwise in FIG. 2). That means that its rotational direction is opposite to the rotational direction of a roller which would roll in the first recoating direction B1 over a base.

The recoating roller 41 arranged ahead pushes pulverulent building material 15 which comes from a (not shown)

powder supply at the border of the build area or which is applied to the build area by a (not shown) powder application unit in front of the recoating roller 41 across the build area 8, thereby drawing it out to a uniform thin powder layer 31a having a first thickness d1 without compacting it too much. The rotation of the recoating roller 41 in a contra-rotating way results in an application of the layer with low shear and thus uniform without interior tensions. The first thickness d1 is determined by the distance of the lower side (the side closest to the build area 8) of the recoating roller 41 arranged ahead from the powder bed 30 so that the first thickness d1 approximately corresponds to this distance of the recoating roller 41 from the powder bed.

The lower side of the compacting blade 45 has a smaller distance from the powder bed 30 than the lower side of the recoating roller 41 arranged ahead. During a movement of the compacting blade 45 in the first recoating direction B1 across the powder layer 31a applied by the recoating roller 41 arranged ahead, a force component thereby acts downwards onto the powder, whereby the powder particles are compressed and the powder layer is compacted. This results in a compacted powder layer 31b having a second thickness d2 which is smaller than the first thickness d1. The second thickness d2 is determined by the distance of the lower side of the compacting blade 45 from the powder bed 30 so that the second thickness d2 approximately corresponds to this distance of the lower side of the compacting blade 45 from the powder bed.

The recoating roller 42 arranged behind is not involved in this process and therefore does not necessarily have to be driven.

After applying and compacting the powder layer, the positions corresponding to the cross-section of the object to be manufactured in this layer are irradiated with the laser beam, whereby the powder layer is selectively solidified. Thereafter, the carrier 10 again is lowered by a predetermined height.

Figure 3:
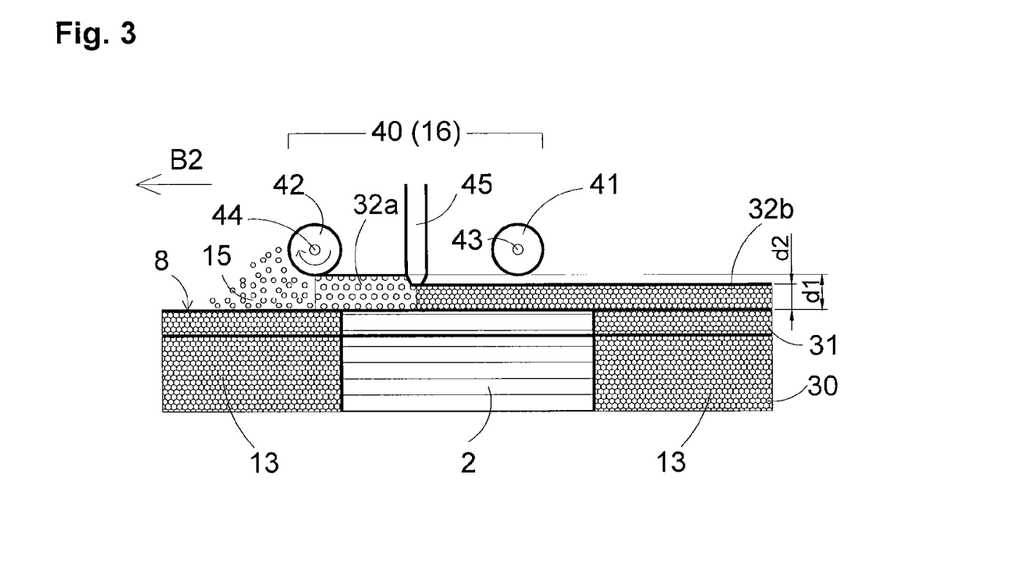
FIG. 3 is a schematic view of a portion of the device shown in FIG. 1 during an application of a powder layer in a second recoating direction.

As shown in FIG. 3, the recoating unit 40 then moves in a second recoating direction B2 across the build area 8 which is opposite to the first recoating direction B1. Opposite does not necessarily mean an angle of 180° in a plan view to the working area, but only that the second recoating direction B2 has a component pointing into the reverse direction of the first recoating direction B1. Preferably, the angle between the first and second recoating direction is between 150° and 210°, in a further preferred way it is 180°.

During the movement into the second recoating direction B2, the roles of the recoating rollers are exchanged: the recoating roller 42 now arranged ahead is driven clockwise what now also corresponds to a rotation in a contra-rotating way due to the reversal of the recoating direction, while the recoating roller 41 now arranged behind may stand still. The surface of the powder bed is now the surface of the previously applied and selectively solidified powder layer 31.

In an analogous way to the procedure described above with reference to FIG. 2, pulverulent building material 15 is drawn-out by the recoating roller 42 now arranged ahead to a regular thin powder layer 32a having a first thickness d1. This powder layer 32a then is compacted by the compacting blade 45, wherein the compacted powder layer 32b has a second thickness d2 which is smaller than the first thickness d1. Thicknesses d1 and d2 may be the same thicknesses as those shown in FIG. 2, or they may differ from those.

The compacted powder layer 32b is then selectively solidified by the laser beam 22, and the procedures shown in FIGS. 2 and 3 are repeated until the object 2 is completed.

The present invention thus provides a recoating unit by which applying and compacting the powder layer are performed separately from each other, which may, however, be used in recoating directions opposite to each other.

Figure 4:
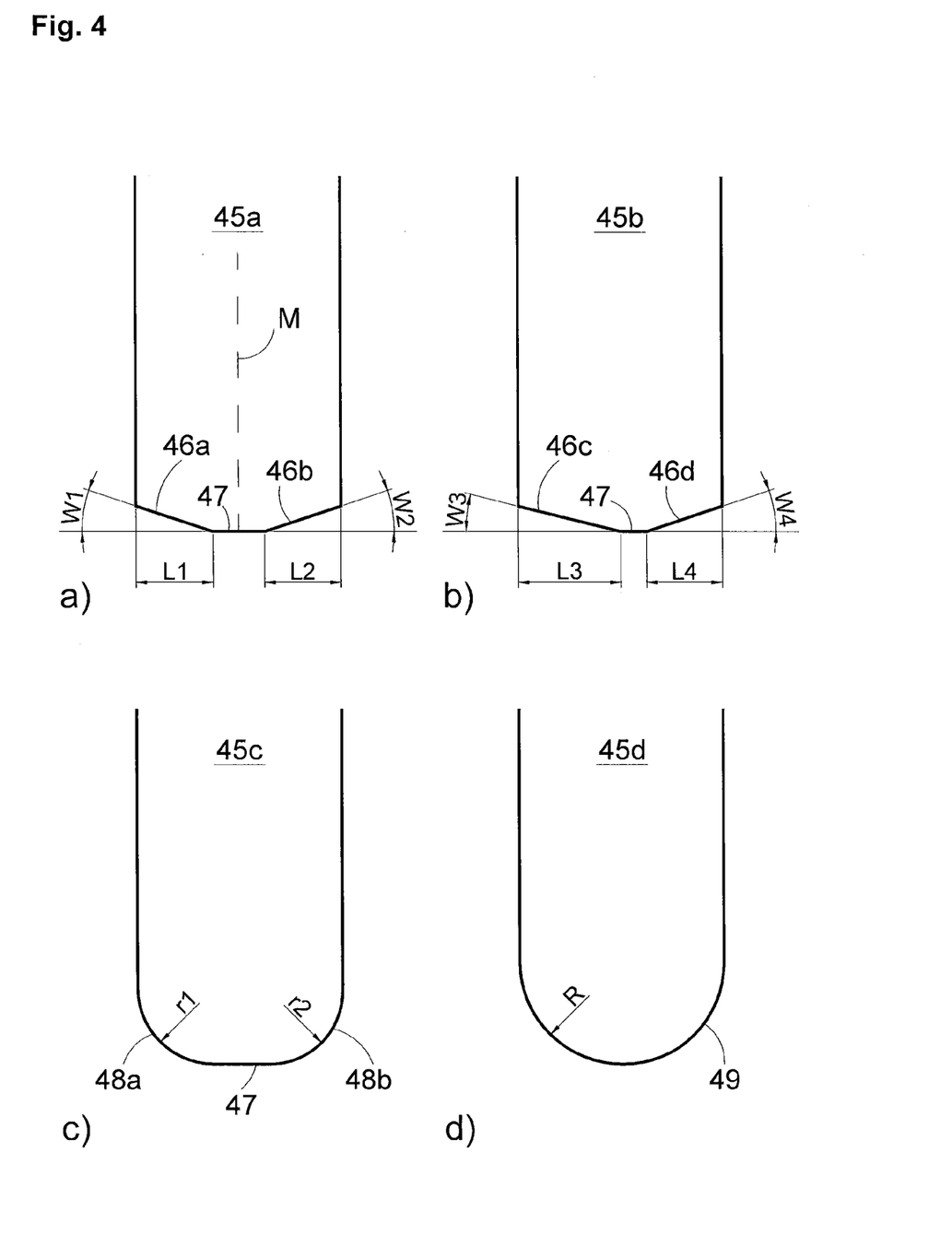
FIG. 4 is a schematic view partially illustrated in cross-section of various compacting blades.

FIG. 4 shows partial sectional views of different compacting blades. They differ in the construction of their lower side which during operation faces the build area.

FIG. 4a shows a compacting blade 45a having, at its lower side, a first and second compacting plane 46a, 46b. Between the compacting planes 46a, 46b, there is a horizontal plane 47 which, during operation, is aligned in parallel with the build area 8. The two compacting planes 46a, 46b rise from the horizontal plane 47 towards the outer edge of the compacting blade 45a by a predetermined slope angle W1, W2.

Depending on the moving direction of the compacting blade 45a, the one or the other of the compacting planes 46a, 46b serves for compacting the powder layer drawn-out by a recoating roller 41, 42. By varying the angle W1, W2 and a length L1 or L2 of the compacting planes 46a, 46b as well as a moving speed of the compacting blade 45a, the compacting effect can be influenced in a broad range.

The compacting blade 45a is mirror-symmetric with regard to its central plane M, i.e. W1=W2 and L1=L2. The compacting planes 46a, 46b may also reach the center of the blade so that no horizontal plane 47 at all remains.

FIG. 4b shows a compacting blade 45b also having, at its lower side, two compacting planes 46c, 46d which, however, are not symmetrical. While the compacting blade 45a achieves the same compacting effects in n recoating directions, it may be advantageous to achieve different compacting effects or forces or directions in the two directions. This may, for example, apply to the double-recoating in which two powder layers are applied first without necessarily solidifying them there between, and then the total layout formed from two partial layers is a selectively solidified.

For this purpose, the compacting planes 46c, 46d of the compacting blade 45b differ from each other in their angles W3, W4 and/or in their lengths L3, L4, i.e. W3≠W4 and/or L3≠L4. Also in this case, the lengths L3, L4 may be so large that no horizontal plane 47 remains.

FIG. 4c shows a compacting blade 45c having, at its lower side, no chamfers, but roundings 48a, 48b. The radii r1, r2 of the roundings may be equal or different from each other. They may also be so large that no horizontal plane 47 remains. Also by means of these roundings 48a, 48b, a compaction of the drawn-out powder layer may be achieved, the effective direction of which can be influenced by the radii r1, r2 of the roundings and the moving the speed of the compacting blade 45c.

FIG. 4d shows a compacting blade 45d having, at its lower side, a rounding 49 in form of a cylindrical segment having a curvature radius R. Also by means of this rounding 49, a compaction of the drawn-out powder layer may be achieved, the effective direction of which can be influenced by the curvature radius R and the moving speed of the compacting blade 45d.

Combinations of the blade geometries described above are possible, too, for example compacting planes according to FIG. 4a or 4b in combination with roundings according to FIG. 4c.

While a compacting blade in the above embodiment serves for compacting the powder layer drawn-out by the recoating roller respectively arranged ahead, it may be replaced by any other compacting element which is suited for compacting the drawn-out powder layer. As an alternative, a smoothing element serving for a further smoothing of the powder layer or only for a further reduction of the layer thickness may be arranged instead of the compacting blade.

While each layer in the above embodiment is selectively solidified after its application, two or more layers may be applied without a solidification there between, and these layers may then be solidified together.

While recoating is performed in the above embodiment alternately in the first and second recoating direction, it may also be performed always in the same recoating direction, for example always in the first recoating direction.

Even though the present invention has been described with regard to a laser sintering device or a laser melting device, it is not restricted to laser sintering or laser melting. It may rather be applied to any arbitrary method for additive manufacturing of a three-dimensional object by applying and selectively solidifying a building material layer by layer.

The irradiation device may for example comprise one or multiple gas or solid body laser(s) or any other kind of laser such as laser diodes, especially VCSEL (Vertical Cavity Surface Emitting Laser) or VECSEL (Vertical External Cavity Surface Emitting Laser), or an array of those lasers. Generally, any device which is able to selectively irradiate energy in form of a wave or particle radiation onto a layer of the building material can be used as an irradiation device. Instead of a laser, for example another light source, an electron beam or any other energy or radiation source suited to solidify the building material may be used. Instead of deflecting a beam, also an irradiation by means of a movable line irradiator may be used. The invention may also be applied to the selective mask sintering, wherein an extended light source and a mask are used, or to the high-speed sintering (HSS), in which a material which increases (absorption sintering) or reduces (inhibition sintering) the absorption of radiation at the corresponding positions is selectively applied to the building material, and then irradiation is performed unselectively onto a large area or by means of the movable line irradiator.

Instead of supplying energy, the selective solidification of the applied building material may also be performed by means of 3D-printing, for example by applying an adhesive. Generally the invention is related to the additive manufacturing of an object by means of applying and selectively solidifying a building material layer by layer independent from the kind and manner in which the building material is solidified.

Various kinds of materials may be used as the building material, preferably powder, in particular metal powder, plastic powder, ceramic powder, sand, or filled or mixed powders.

The invention claimed is:

1. Recoating unit for equipping or retrofitting a device for additive manufacturing of a three-dimensional object by selectively solidifying a building material, layer by layer, wherein the device comprises a recoater movable across a build area for applying a layer of the building material within the build area and a solidification device for selectively solidifying the applied layer at positions corresponding to a cross-section of the object to be manufactured, and is formed and/or controlled to repeat the steps of applying and selectively solidifying until the object is completed, wherein the recoating unit comprises:
at least two recoating rollers spaced apart from each other in a first direction and extending into a second direction transversely to the first direction, and
a compacting and/or smoothing element arranged between the two recoating rollers in the first direction and extending into the second direction,
wherein the recoating unit is adapted to:
draw-out building material to a regular layer, depending on the movement of the recoating unit into the first direction or into its reverse direction, using the recoating roller arranged ahead in the respective moving direction, and
compact or smoothen the layer drawn-out by the recoating roller arranged ahead using the compacting and/or smoothing element.

2. Recoating unit according to claim 1, wherein the compacting and/or smoothing element is arranged essentially centered in the first direction between the two recoating rollers and/or
is formed essentially in an unsymmetrical way or in a mirror-symmetrical way in the first direction.

3. Recoating unit according to claim 1, wherein the compacting and/or smoothing element is a blade extending into the second direction and into a third direction perpendicular to the first and second directions which has, at its lower side positioned in the third direction and facing into the direction of the build area, at least one sloped compacting and/or smoothing plane and/or a rounding, and/or a cylindrical segment and/or a roof-shaped element, for compacting and/or smoothing the layer.

4. Recoating unit according to claim 1, wherein the compacting and/or smoothing element is arranged in an exchangeable way in the recoating unit.

5. Recoating unit according to claim 1, wherein the compacting and/or smoothing element is arranged in the third direction in a manually or automatically adjustable way in the recoating unit.

6. Recoating unit according to claim 1, wherein
the two recoating rollers have the same diameter and/or
the two recoating rollers are arranged drivable in rotational directions opposite to each other in the recoating unit.

7. Recoater for equipping or retrofitting a device for additive manufacturing of a three-dimensional object by selectively solidifying a building material, layer by layer, wherein the device is adapted to receive the recoater in a way so that it is movable across a build area for applying a layer of the building material within the build area, comprises a solidification device for selectively solidifying the applied layer at positions corresponding to a cross-section of the object to be manufactured, and is formed and/or controlled to repeat the steps of applying and selectively solidifying until the object is completed,
wherein the recoater comprises a recoating unit according to claim 1.

8. Recoater according to claim 7, wherein the recoating unit is an exchangeable recoating module.

9. Device for additive manufacturing of a three-dimensional object by selectively solidifying a building material, layer by layer comprising:
a recoater movable across a build area for applying a layer of the building material within the build area and
a solidification device for selectively solidifying the applied layer at positions corresponding to a cross-section of the object to be manufactured,
wherein the device is formed and/or controlled to repeat the steps of applying and selectively solidifying until the object is completed, and
wherein the recoater is formed according to claim 7.

10. Device according to claim 9, further comprising a device for supplying building material in front of the roller arranged ahead in the respective movement direction.

11. Device according to claim 9, wherein the recoating unit is arranged within the device in a way that the first direction is the movement direction of the recoater across the build area and the third direction essentially is the vertical direction perpendicular to the building area.

12. Recoating unit according to claim 1, wherein the at least two recoating rollers extend into a second direction perpendicularly to the first direction.

\* \* \* \* \*